US005385483A

United States Patent [19]

Lin

[11] Patent Number: 5,385,483

[45] Date of Patent: Jan. 31, 1995

[54] CONNECTOR DEVICE

[76] Inventor: Tse H. Lin, No. 2, Lane 126, Pu Ting Rd., Hsin Chu City, Taiwan, Prov. of China

[21] Appl. No.: 135,680

[22] Filed: Oct. 13, 1993

[51] Int. Cl.[6] ........ H02G 15/08

[52] U.S. Cl. ........ 439/424; 439/421

[58] Field of Search ........ 439/421, 424, 425

[56] References Cited

U.S. PATENT DOCUMENTS

| | | | |
|---|---|---|---|
| 3,064,072 | 11/1962 | Graff et al. | 439/424 |
| 3,265,807 | 8/1966 | Smith | 439/424 |
| 3,283,061 | 11/1966 | Bolling | 439/424 |
| 3,784,731 | 1/1974 | Newbold | 439/421 |
| 4,835,241 | 9/1974 | Masterson et al. | 439/424 |
| 4,839,595 | 10/1974 | Yonkers | 439/424 |

*Primary Examiner*—Daniel W. Howell

*Attorney, Agent, or Firm*—Merchant, Gould, Smith, Edell, Welter & Schmidt

[57] ABSTRACT

A connector device includes an inner sleeve enclosed by an intermediate sleeve which is further enclosed by an outer sleeve. The inner sleeve is made of flexible conductive material having a plurality of triangular pressouts in an inner periphery thereof. The outer sleeve includes a body at a middle portion thereof and two necks at two longitudinal ends thereof and receives the inner sleeve and the intermediate sleeve in the body thereof. The connector device allows two sheathed cables to be parallely inserted into either end thereof without being deviated by the pressouts of the inner sleeve. The outer sleeve is made of flexible non-conductive material and the intermediate sleeve is made of flexible conductive material; thus, the connector device is allowed to be clamped causing the pressouts to penetrate outer sheaths of the cables, thereby electrically connecting the two cables via the inner sleeve.

17 Claims, 3 Drawing Sheets

CONNECTOR DEVICE

BACKGROUND OF THE INVENTION

1. Field of the Invention

The present invention relates to a connector device, especially one which is allowed to electrically connect two sheathed cables by inserting the cables thereinto and clamping the connector device.

2. Description of the Prior Art

A conventional connector device as shown in FIG. 6 comprises an inner sleeve 30 enclosed by an intermediate sleeve 31 which is further enclosed by an outer sleeve 32. The inner sleeve 30 is illustrated in exploded view for showing the inner periphery thereof. There are a plurality of annular pressouts 301 in the inner periphery of the inner sleeve 30. The outer sleeve 32 is sectionally viewed as an oval and one end is formed as an oval opening while the other end is tapered into a tubular portion which is circular in a cross-sectional view. The intermediate sleeve 31 has an oval opening and a tapering blocked end similar to the outer sleeve 32. The inner sleeve 30 has a similar structure as the intermediate sleeve 31 except that the two ends thereof are oval openings. When assembling the connector device, the inner sleeve 30 is inserted in the intermediate sleeve 31 from the oval opening thereof and the intermediate sleeve 31 is inserted into the outer sleeve 32 from the oval opening thereof, thus limiting the assembled work in a specific direction and causing inconvenience for assembling. Moreover, the circular pressouts 301 of the inner sleeve 30 cause deviation of the passage of the cables 33 to be inserted thereinto, thus the user has to insert the cables 33 into the inner sleeve 30 very carefully.

The present invention has arisen to mitigate and/or obviate the afore-described disadvantages of the conventional connector device.

SUMMARY OF THE INVENTION

The primary objective of the present invention is to provide a connector device which allows a user to electrically connect two sheathed cables by inserting the two sheathed cables into the connector device easily and then clamping the connector device.

In accordance with one aspect of the invention, there is provided a connector device including an inner sleeve enclosed by an intermediate sleeve which is further enclosed by an outer sleeve. The inner sleeve is made of flexible conductive material having a plurality of triangular pressouts in an inner periphery thereof. The outer sleeve includes a body at a middle portion thereof and two necks at two longitudinal ends thereof and receives the inner sleeve and the intermediate sleeve in the body thereof. The connector device allows two sheathed cables to be inserted thereinto from either ends thereof without being retarded by the pressouts of the inner sleeve. The outer sleeve is made of flexible non-conductive material and the intermediate sleeve is made of flexible conductive material thus the connector device is allowed to be clamped and causes the pressouts to penetrate outer sheaths of the cables, thereby electrically connecting the two cables via the inner sleeve.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
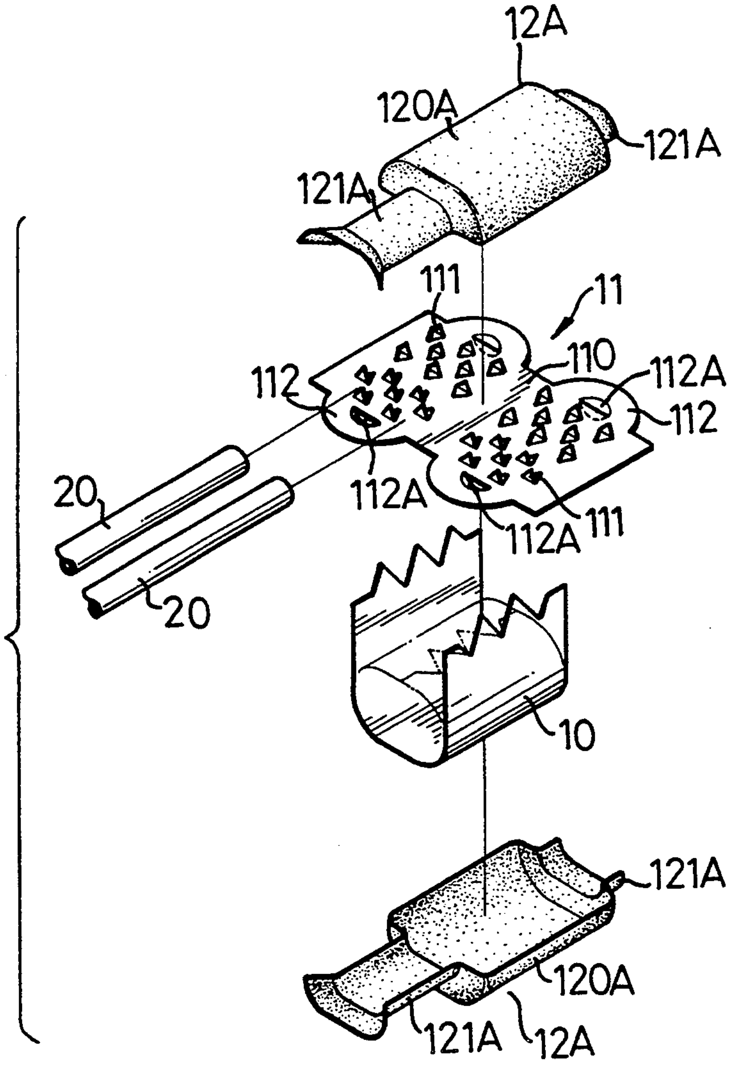
FIG. 1 is an exploded perspective view of a connector device in accordance with the present invention.
Figure 2:
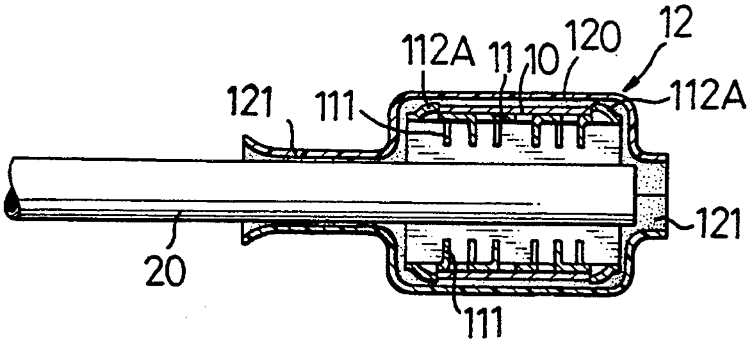
FIG. 2 is a sectional view of the connector device including an additional cable for illustrating how the external cable is inserted into the connector device.
Figure 5:
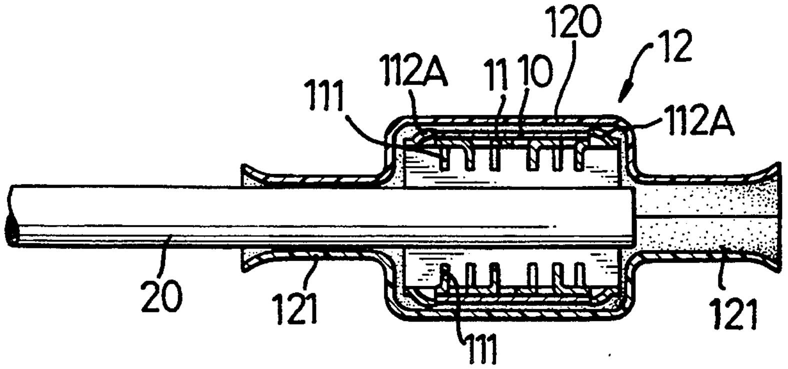
FIG. 5 is another embodiment of the connector device with the two necks thereof having identical structure.

Referring to the drawings and initially to FIGS. 1 and 2, a connector device according to a preferred embodiment of the invention comprises an inner sleeve 11 enclosed by an intermediate sleeve 10 which is further enclosed by an outer sleeve 12. The inner sleeve 11 is made of flexible conductive material and has a plurality of triangular pressouts 111 in an inner periphery thereof. The inner sleeve 11 has two ears 112 respectively extending from two ends thereof. Each ear 112 has a semicircular pressout 112A thereon. The intermediate sleeve 10 is also made of flexible conductive material. The intermediate sleeve 10 encloses the inner sleeve 11 except the ears 112 which protrude out of two distal openings of the intermediate sleeve 10. The ears 112 of the inner sleeve 11 are bent such that each semicircular pressout 112A thereof abuts against a corresponding edge of the opening of the intermediate sleeve 10, thereby tying the intermediate sleeve 10 and the inner sleeve 11 together. The outer sleeve 12 is made of flexible non-conductive material and comprises two halves 12A each having a body 120A and two necks 121A extending from two distal sides of the body 120A. The two halves 12A are welded together thus forming the outer sleeve 12 including a body 120 at a middle portion and two necks 121 at two distal ends thereof. The tied sleeves 10 and 11 are positioned in the body 120 of the outer sleeve 12 before the latter is formed from the two halves 12A. The two necks 121 each defining a neck channel therein are in communication with each other via the inner space of the body 120. The triangular pressouts 111 of the inner sleeve 11 do not interfere with an imaginary extension of the two neck channels as shown in FIG. 2. Two sheathed cables 20 are allowed to be inserted into the connector device via either of the necks 121 and are guided by the corresponding neck channel thereof. In this embodiment, the two necks 121 are not made to be identical. One neck is longer than the other and the cables 20 are inserted into the opening of the longer neck. The opening of the longer neck (the left one in the figure) is expanded outward for easily receiving the cables 20. The cables 20 are guided via the longer neck channel, through the inner space of the inner sleeve 11, and substantially to the shorter neck channel. In another embodiment shown in FIG. 5, the two necks 121 have exactly the same structure; thus the cables 20 are easily inserted into either neck 121.

Figure 3:
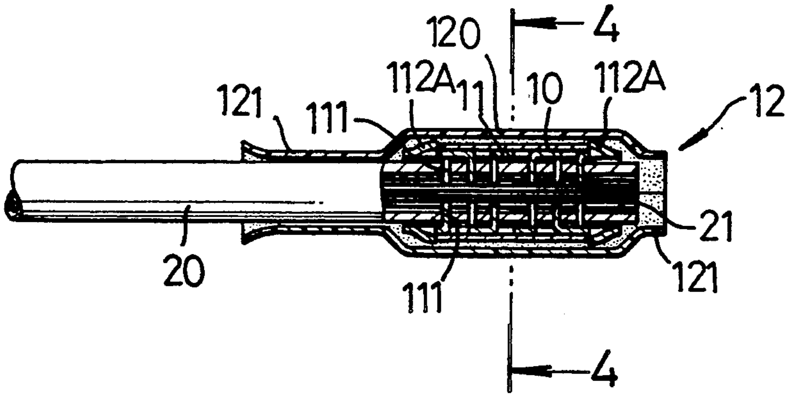
FIG. 3 illustrates that the connector device is clamped such that the pressouts therein can penetrate the sheath of the cable.
Figure 4:
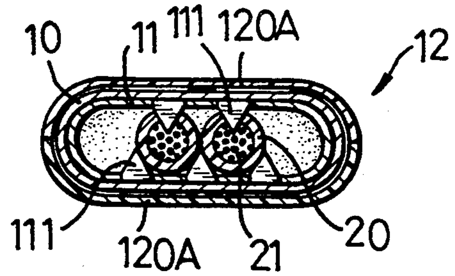
FIG. 4 is a sectional view taken from FIG. 3 illustrating pressouts therein are arranged such that the cable will not be severed when the connector device is clamped.
Figure 6:
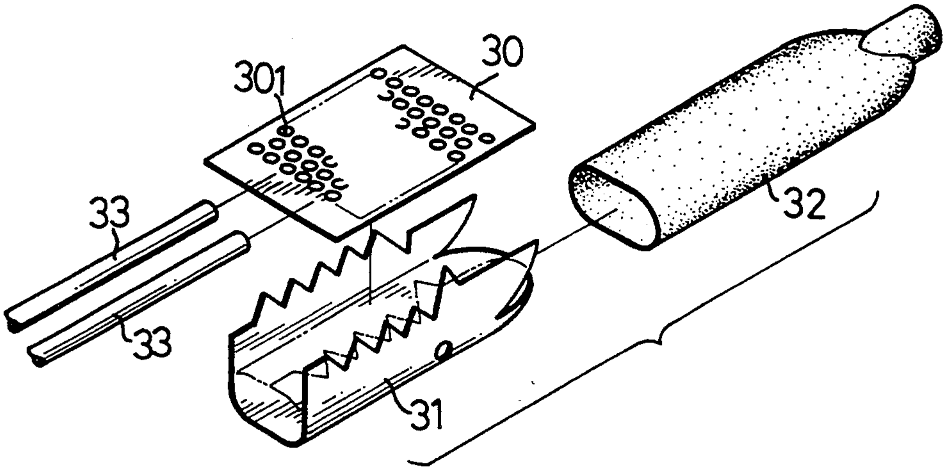
FIG. 6 PRIOR ART
FIG. 6 is an exploded view of a conventional connector device.

Referring to FIG. 3, the connector device and the cables 20 therein are clamped such that the triangular pressouts 111 penetrate the sheaths of the cables 20 thereby electrically connecting the two cables 20. Additionally, the triangular pressouts 111 are formed on two opposite walls of the inner sleeve 11, each pressout 111 is staggered relative to its adjacent pressouts 111, and each pressout 111 is staggered relative to corresponding pressouts 111 on the opposite wall of the inner sleeve as shown in FIG. 4, thus the cables 20 will not be severed when the connector device is clamped.

Again, referring to FIG. 1, another simpler embodiment of the present invention can be obtained from this figure by omitting the intermediate sleeve 10 and omitting the four ears 112 of the inner sleeve 11. In this embodiment, the inner sleeve 11 is directly enclosed by the outer sleeve 12. Actually, the outer sleeve 12 does not need to take the form as mentioned, as it will still work if only it contains two openings at two distal ends thereof to receive the inner sleeve 11.

Although the invention has been explained in relation to its preferred embodiment, it is to be understood that many other possible modifications and variations can be made without departing the spirit and scope of the invention as hereinafter claimed.

I claim:

1. A connector device comprising:

an inner sleeve (11) made of flexible conductive material and having a plurality of pressouts (111) in an inner periphery thereof;

an outer sleeve (12) having two openings at two distal ends thereof made of flexible nonconductive material for enclosing said inner sleeve (11) therein;

wherein said connector device allows two sheathed cables (20) to be parallely inserted into either of said ends thereof without being deviated by said pressouts (111) of said inner sleeve (11) and is allowed to be clamped by external force thus causing said pressouts (111) to penetrate outer sheaths of said two cables (20), thereby electrically connecting said two cables (20) via said inner sleeve (11).

2. The connector device as claimed in claim 1 wherein said pressouts (111) are triangular pressouts.

3. The connector device as claimed in claim 1 wherein said pressouts (111) are staggered whereby said pressouts are prevented from severing the cables (20) surrounded thereby when said connector device is clamped.

4. The connector device as claimed in claim 1 further comprising an intermediate sleeve (10) enclosing said inner sleeve (11) and being enclosed by said outer sleeve (12), said intermediate sleeve (10) being made of flexible material.

5. The connector device as claimed in claim 4 wherein said pressouts (111) are triangular pressouts.

6. The connector device as claimed in claim 4 wherein said pressouts (111) are staggered whereby said pressouts are prevented from severing the cables (20) surrounded thereby when said connector device is clamped.

7. The connector device comprising:

an inner sleeve (11) made of flexible conductive material and having a plurality of pressouts (111) in an inner periphery thereof;

an intermediate sleeve (10) enclosing said inner sleeve (11) being made of flexible material;

an outer sleeve (12) made of flexible nonconductive material including a body (120) at a middle portion thereof and two necks (121) at two longitudinal ends thereof and enclosing said intermediate sleeve (10) and said inner sleeve (11) in said body (120);

wherein said connector device allows two sheathed cables (20) to be parallely inserted into either of said necks (121) thereof without being deviated by said pressouts (111) of said inner sleeve (11) and is allowed to be clamped by external force thus causing said pressouts (111) to penetrate outer sheaths of said two cables (20), thereby electrically connecting said two cables (20) via said inner sleeve (11).

8. The connector device as claimed in claim 7 wherein said pressouts (111) are triangular pressouts.

9. The connector device as claimed in claim 7 wherein said pressouts (111) are staggered whereby said pressouts are prevented from severing the cables (20) surrounded thereby when said connector device is clamped.

10. The connector device as claimed in claim 7 wherein said outer sleeve (12) comprises two halves (12A), each having a body portion (120A) and two neck portions (121A) extending from two longitudinal edges therefrom, and said outer sleeve encloses said intermediate sleeve (10) and said inner sleeve (11) in the two body portions (120A) before said two halves (12A) are welded together. wherein said pressouts (111) are triangular pressouts.

11. The connector device as claimed in claim 7 wherein at least one of said necks (121) has an opening expanded outward for easily receiving the cables (20).

12. A connector device comprising:

an inner sleeve (11) made of flexible conductive material and having a plurality of pressouts (111) in an inner periphery thereof;

an outer sleeve (12) made of flexible nonconductive material including a body (120) at a middle portion thereof and two necks (121) at two longitudinal ends thereof and enclosing said inner sleeve (11) in said body (120);

wherein said connector device allows two sheathed cables (20) to be parallely inserted into either of said necks (121) thereof without being deviated by said pressouts (111) of said inner sleeve (11) and is allowed to be clamped by external force thus causing said pressouts (111) to penetrate outer sheaths of said two cables (20), thereby electrically connecting said two cables (20) via said inner sleeve (11).

13. The connector device as claimed in claim 12 wherein said pressouts (111) are triangular pressouts.

14. The connector device as claimed in claim 12 wherein said pressouts (111) are staggered whereby said pressouts are prevented from severing the cables (20) surrounded thereby when said connector device is clamped.

15. The connector device as claimed in claim 12 wherein said outer sleeve (12) comprises two halves (12A), each having a body portion (120A) and two neck portions (121A) extending from two longitudinal edges therefrom, and said outer sleeve encloses said intermediate sleeve (10) and said inner sleeve (11) in the two body portions (120A) before said two halves (12A) are welded together.

16. The connector device as claimed in claim 12 wherein at least one of said necks (121) has an opening expanded outward for easily receiving the cables (20).

17. The connector device as claimed in claim 3, wherein said pressouts are formed on two opposite walls of said inner sleeve; each pressout being staggered relative to its adjacent pressouts; and each pressout being staggered relative to corresponding pressouts on said opposite wall.

* * * * *